US007295599B1

(12) United States Patent
Karsi

(10) Patent No.: US 7,295,599 B1
(45) Date of Patent: Nov. 13, 2007

(54) DIGITAL CONVERSION AND COMPENSATION SYSTEM

(75) Inventor: Murat F. Karsi, Encinitas, CA (US)

(73) Assignee: Ellipsis Digital Systems, Inc., Carlsbad, CA (US)

( * ) Notice: Subject to any disclaimer, the term of this patent is extended or adjusted under 35 U.S.C. 154(b) by 915 days.

(21) Appl. No.: 10/309,492

(22) Filed: Dec. 4, 2002

Related U.S. Application Data

(60) Provisional application No. 60/336,796, filed on Dec. 4, 2001.

(51) Int. Cl.
*H04B 1/38* (2006.01)
(52) U.S. Cl. ............... 375/219; 375/296; 455/114.2
(58) Field of Classification Search ............... 375/219, 375/295–297, 285, 259–260, 316, 324; 455/63.1, 455/67.13, 114.2, 114.3
See application file for complete search history.

(56) References Cited

U.S. PATENT DOCUMENTS

| 5,732,333 | A | * | 3/1998 | Cox et al. ............... 455/126 |
| 5,930,301 | A | * | 7/1999 | Chester et al. ............ 375/296 |
| 6,141,390 | A | * | 10/2000 | Cova ..................... 375/297 |
| 6,314,142 | B1 | * | 11/2001 | Perthold et al. .......... 375/296 |
| 6,711,217 | B1 | * | 3/2004 | Jeong .................... 375/297 |

* cited by examiner

*Primary Examiner*—Khanh Tran
(74) *Attorney, Agent, or Firm*—Blakely, Sokoloff, Taylor & Zafman LLP

(57) ABSTRACT

According to one aspect of the invention, a system is provided which includes an adaptive compensation component and a conversion component. The adaptive compensation component performs spectral and linearity compensation on input digital signals to generate output digital signals that are compensated against spectral and linearity variations in the system. The conversion component is coupled to the adaptive compensation component and performs conversion between digital and analog formats. The conversion component receives digital signals generated by the adaptive compensation component and converts the received digital signals to analog format. The conversion component also receives analog signals and converts the received analog signals to digital format for inputted to the adaptive compensation component.

10 Claims, 5 Drawing Sheets

DIGITAL CONVERSION AND COMPENSATION SYSTEM

CROSS REFERENCE TO RELATED APPLICATIONS

This non-provisional United States (US) patent application claims the benefit of U.S. Provisional Application No. 60/336,796 filed on Dec. 4, 2001, entitled "Digital Conversion and Compensation System."

BACKGROUND OF THE INVENTION

1. Field of the Invention

The present invention relates to the fields of signal processing and communications. More specifically, the present invention relates to a method, apparatus, and system for digital conversion and compensation.

2. General Background

One of the key tradeoffs in the design and manufacturing of digital communications transceivers is made between cost and performance. Cost can be identified by the bill of materials (BOM), or the total manufacturing cost that is required to assemble, calibrate and test the transceiver. Performance is typically identified through metrics, such as bit or packet error rate.

Analog components of a digital communications receiver are significant contributors to the overall cost, due to compensations incorporated for manufacturing variability, temperature, and aging, and possibly requirements for high performance (e. g. filters with very high selectivity, matching characteristics of the I and Q arms of quadrature receiver and transmitters, etc. ). These variations and the techniques to compensate for these variations contribute to the cost vs. performance tradeoff.

Accordingly, there exists a need for an effective and efficient method, apparatus, and system for performing signal compensation and/or conversion in data communication systems (e. g., transceivers).

DETAILED DESCRIPTION OF THE INVENTION

Figure 1:
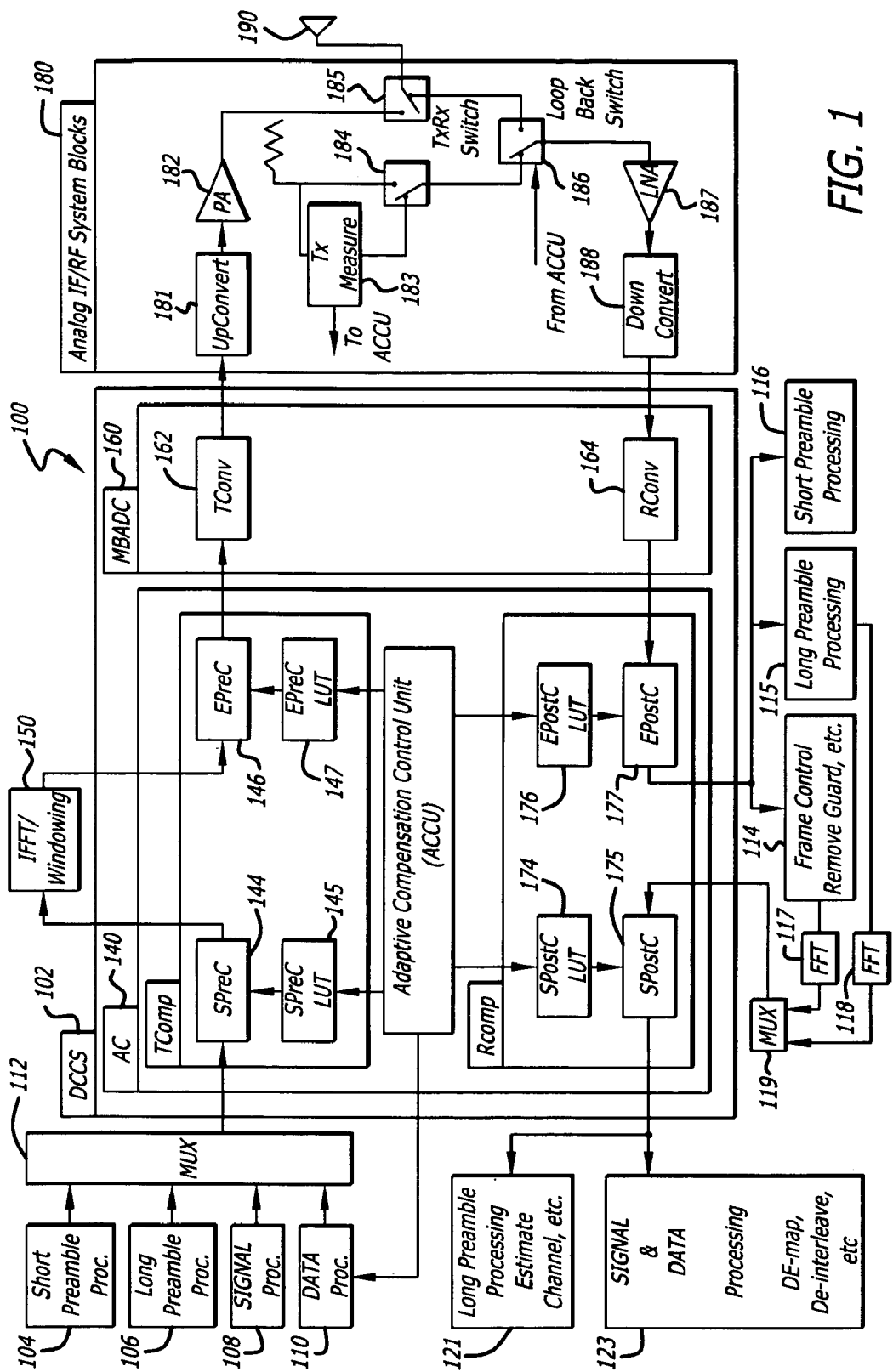
FIG. 1 shows a block diagram of an exemplary transceiver including a digital compensation and conversion system in accordance with one embodiment of the invention.

In the following detailed description numerous specific details are set forth. However, it is understood that embodiments of the invention may be practiced without these specific details.

Functional requirements and architecture specifications for a Digital Conversion and Compensation System (DCCS) blocks of the 802.11a transceiver, in accordance with one embodiment of the invention, are described below.

As described herein, effort has been exerted towards integrating the DCCS with the existing digital demodulator. In addition, some of the DCCS component actors can be implemented by re-using actors designed for the digital demodulator. The actors designed for the digital demodulator are referenced where appropriate.

DCCS is required to accomplish two major tasks for the transceiver. These tasks can include:

1. Providing a flexible interface between the digital demodulator and analog RF chip.
2. Providing adaptive digital compensation of the analog components.

Task 1: DCCS offers flexible dual intermediate frequency (IF) and Baseband Analog to Digital (A/D) conversion capability. As a result, the present invention provides the flexibility of interfacing with RF chips having either low frequency IF interface or baseband specifications.

With the DCCS low frequency IF conversion, the following three advantages are realized: (1) Various IF frequencies and sampling frequencies can be easily accommodated. As a result, the present invention is flexible and can interface with several different RF chips. (2) The DCSS low IF frequency conversion includes digital quadrature mixers (DQM), which eliminates problems that are caused by analog mixers due to insufficient dynamic range and I-Q imbalance. (3) Adjacent channel rejection can be done digitally, thereby reducing or possibly eliminating the IF analog filtering and dynamic range requirements and leading to cost reduction. (Digital filtering circuitry has significantly lower cost compared to the price of a SAW or ceramic filter with similar filtering characteristics. In 802.11a, adjacent channel interference rejection requirements lead to stringent requirements for analog IF filtering. Such filtering is typically done with SAW or ceramic filters that contribute significantly to the BOM.)

With DCCS baseband conversion, the present invention provides the flexibility to interface with conventional Baseband I-Q type RF front-end designs. Radio front-end designs that include an integrated IF/Baseband converter are interfaced directly making full use of the radio front end IF/Baseband conversion capability. Radio front-end designs that include separate RF/IF and IF/Baseband converters can be interfaced at either the IF or baseband outputs. If the interface is made at the IF output, the IF/baseband strip is eliminated, thereby reducing BOM cost and power consumption.

The DCCS flexible interface with multiple sampling and IF frequencies can enable reduced RF chip cost, reduced power consumption, and enhanced performance.

Task 2: DCCS offers adaptive digital compensation of the analog components for accommodating variations in analog component performance characteristics and for calibration at the factory. Thus, a low cost high performance 802.11a transceiver can be implemented.

As mentioned above, one of the key tradeoffs in the design and manufacturing of digital communications transceivers is made between cost and performance. Cost can be identified by the bill of materials (BOM), or the total manufacturing cost that is required to assemble, calibrate and test the transceiver. Performance is typically identified through metrics, such as bit or packet error rate.

As mentioned above, analog components of a digital communications receiver are significant contributors to the overall cost, due to compensations incorporated for manufacturing variability, temperature, and aging, and possibly requirements for high performance (e.g. filters with very high selectivity, matching characteristics of the I and Q arms of quadrature receiver and transmitters, etc.). These variations and the techniques to compensate for these variations contribute to the cost vs. performance tradeoff. According to one embodiment of the invention, the DCCS as described herein provides digital algorithms to perform the following for reducing analog costs:

1. Initial factory calibration for variations of the transceiver components around their nominal values.
2. Compensation against component and system variations due to effects of aging and temperature during operation of the transceiver in the field.
3. Utilization of low cost analog system components and compensating for their deficiencies by calibration and compensation algorithms.

3.1 Overall Architecture

An exemplary system block diagram of a transceiver 100 that includes the DCCS 102 and its two sub blocks 140, 160 that address these tasks are shown in FIG. 1. The interface between the digital demodulator and analog RF chip is performed by the Multi Band Analog/ Digital Conversion (MBADC) block 160 and compensation of transceiver against variations is performed by Adaptive Compensation (AC) block 140. We will first describe the signal flow through the transceiver and DCCS. Details of individual system blocks will be provided in the following sections.

At the transmitter, Short Preamble, Long Preamble, DATA and SIGNAL fields of an 802.11a packet is generated in the Short Preamble Proc. 104, Long Preamble Proc. 106, DATA Proc. 110, and SIGNAL Proc. 108 blocks. Processing in these blocks should include all the relevant processing prior to IFFT and windowing. Output of these blocks is processed in the AC. In the AC block, first compensation for spectral characteristics takes place in the Spectral Pre-Compensation block (SPreC) 144. After the SPreC block, IFFT and windowing are performed. After IFFT and windowing, the signal is processed by the Envelope Pre Compensator (EPreC) 146 that provides pre compensation against non-linearities of the transmitter chain. Next, the signal is processed in the MBADC block. The MBADC block converts the digital baseband signal to analog baseband format or analog low IF format. The section of the MBADC block that is in the transmitter chain is the Transmitter Conversion (TConv) block 162. Upon being processed at the TConv block, the signal is up-converted, amplified by the Power Amplifier (PA) 182 and transmitted through the antenna 190.

At the receiver, the received signal at the antenna output is passed through the LNA 187 and down converted to either baseband or low IF frequencies. The signal is then processed in the MBADC block. The MBADC block converts its input signal that is in baseband analog or low IF analog format to digital baseband format at its output. The section of the MBADC block that is in the receiver chain is the Receiver Conversion (RConv) block 164. Upon processing in the RConv block, the signal is processed in the AC block. In the AC block, first compensation for envelope characteristics takes place in the Envelope Post-Compensation block (EPostC) 177. Following the EPostC block, specific processing for SIGNAL, DATA and Long Preamble Processing takes place. Processing for SIGNAL, DATA and Long Preamble data blocks include FFT and removal of the guard interval. Upon FFT and Guard Removal, Spectral Post-Compensator (SPostC) block 175 compensates the signal for spectral compensation of the receiver chain. The signal is then processed in the digital demodulator. Processing steps include channel estimation and correction using pilot sub-carriers, symbol de-mapping, etc.

3.2 Multi Band Analog/Digital Conversion (MBADC) System 3.2.1 Transmitter Converter (Tconv)

3.2.1.1 Input specification

The input signal to TConv is an OFDM modulated 802.11a digital baseband signal. The input sampling frequency is to be 20 MHz. The input signal resolution is to be flexible and be specified by a parameter, N_DAC. The default setting of the N_DAC is 10 bits.

Please note that for two of the up-conversion options, the ordering of the data input symbols that form OFDM symbols have to be modified. Specifically for $f_{IF}$=30 MHz and $f_{IF}$=50 MHz options, the order of the signals should be reversed prior to transmission. This is equivalent to reversing the spectral components of the OFDM symbol around the zero frequency.

3.2.1.2 Output Signal Specification

TConv should be capable of outputting: 1) Analog baseband 802.11a signal in I-Q format, and 2) Analog bandpass 802.11a analog signal at IF frequencies of 10, 20, 30, 50, 60, or 70 MHz. The analog bandpass signal output can be in I-Q format, or the I and Q signals can be combined to a single channel format.

3.2.1.3 Architecture Specification

Figure 2:
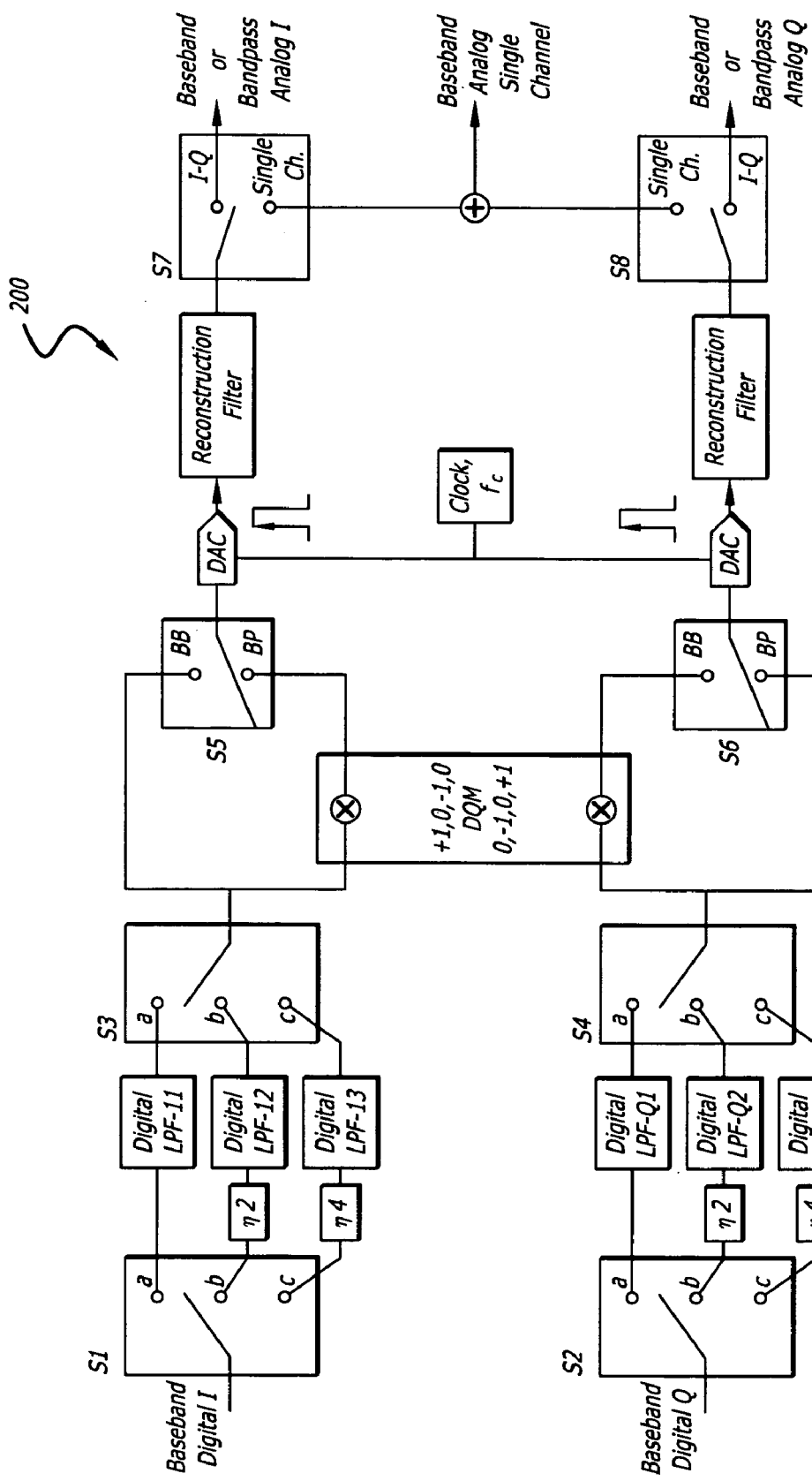
FIG. 2 shows a block diagram of an exemplary transmitter converter (Tconv) in accordance with one embodiment of the invention.

TConv should convert its input digital signal with mentioned specifications to analog format with mentioned specifications. For an exemplary block diagram representation, please see FIG. 2.

3.2.1.3.1 Clock, $f_c$

Exemplary clock ($f_c$) frequencies for each of IF frequency ($f_{IF}$) modes are described in Table 1. For each of output frequencies modes, exemplary effective sampling frequencies obtained by particular settings of clock frequencies are also given in Table 1. Effective sampling frequency obtained for baseband output modes is the same as the clock frequency.

TABLE 1

Exemplary Transmitter Converter IF and Clock Frequencies

| Output Frequency, (Baseband or IF ($f_{IF}$, MHz)) | Clock Frequency (fc), MHz |
|---|---|
| Base Band, Option 1 | 20 |
| Base Band, Option 2 | 40 |
| Base Band, Option 3 | 80 |

TABLE 1-continued

Exemplary Transmitter Converter IF and Clock Frequencies

| Output Frequency, (Baseband or IF ($f_{IF}$, MHz)) | Clock Frequency (fc), MHz |
|---|---|
| 10 | 40 |
| 20 | 80 |
| 30 | 40 |
| 50 | 40 |
| 60 | 80 |
| 70 | 40 |

3.2.1.3.2 Digital Quadrature Mixer (DQM)

DQM block performs up conversion of baseband signals to low-IF frequencies. The mixer sequences represent cos() and -sin() mixing signals. Due to special relationship of the sampling frequency and desired low IF frequency, these signals are repetitive forms of +1,0, −1, 0 and 0, −1, 0, +1.

3.2.1.3.3 D/A Converters

The input signal resolution is to be flexible and be specified by a parameter, N_DAC. The default setting of the N_DAC is 10 bits. For simulation models to be used for DACs, please see section entitled "Analog IF/RF System Blocks Modeling" below. Please note that a D/A converter actor has already been implemented. It is possible to reuse this actor and save development time.

3.2.1.3.4 Switches

There are several switches that direct the signal flow through the TConv as can be seen in FIG. 1. These switches enable operation with various input sampling frequencies and baseband and bandpass input and output signal formats. In one embodiment, each switch is identified with a switch number and labels that describe switch settings, as shown in Table 2. The switches S1, S2, S3, and S4 enable input signal sampling frequencies of 20, 40 and 80 MHz. Switches S5 and S6 choose between low IF bandpass (BP) and baseband (BB) input. Switches S7 and S8 choose between baseband/bandpass in I-Q, and, bandpass single line output.

TABLE 2

Exemplary Switch settings for operational modes of TConv

| Output Frequency, (Baseband or IF ($f_{IF}$, MHz)) | S1 | S2 | S3 | S4 | S5 | S6 | S7 | S8 |
|---|---|---|---|---|---|---|---|---|
| Base Band, Option 1 | a | A | a | a | BB | BB | I-Q | I-Q |
| Base Band, Option 2 | b | B | b | b | BB | BB | I-Q | I-Q |
| Base Band, Option 3 | c | C | c | c | BB | BB | I-Q | I-Q |
| 10 | b | B | b | b | BP | BP | I-Q or Single Channel | I-Q or Single Channel |
| 20 | c | C | c | c | BP | BP | I-Q or Single Channel | I-Q or Single Channel |
| 30 | b | B | b | b | BP | BP | I-Q or Single Channel | I-Q or Single Channel |
| 50 | b | B | b | b | BP | BP | I-Q or Single Channel | I-Q or Single Channel |
| 60 | c | C | c | c | BP | BP | I-Q or Single Channel | I-Q or Single Channel |
| 70 | b | B | b | b | BP | BP | I-Q or Single Channel | I-Q or Single Channel |

3.2.1.3.5 Interpolators

Interpolators are utilized to accommodate various input sampling frequencies. There are two types of interpolators: up sampling by 2 and 4. A "zero insertion" type up sampler followed by a digital lowpass filter should be used to increase the sampling rate of the input signal. Exemplary interpolation ratios for each IF frequency mode are described in Table 3. Please note that the interpolators are chosen by using appropriate switches. Thus, Table 3 is closely tied to Table 2.

TABLE 3

Exemplary Interpolation Ratios

| Output Frequency, (Baseband or IF ($f_{IF}$, MHz)) | Interpolation Ratio |
|---|---|
| Base Band, Option 1 | N/A |
| Base Band, Option 2 | 2 |
| Base Band, Option 3 | 4 |
| 10 | 2 |
| 20 | 4 |
| 30 | 2 |
| 50 | 2 |
| 60 | 4 |
| 70 | 2 |

3.2.1.3.6 Digital Lowpass Filters (DLPF)

Figure 3:
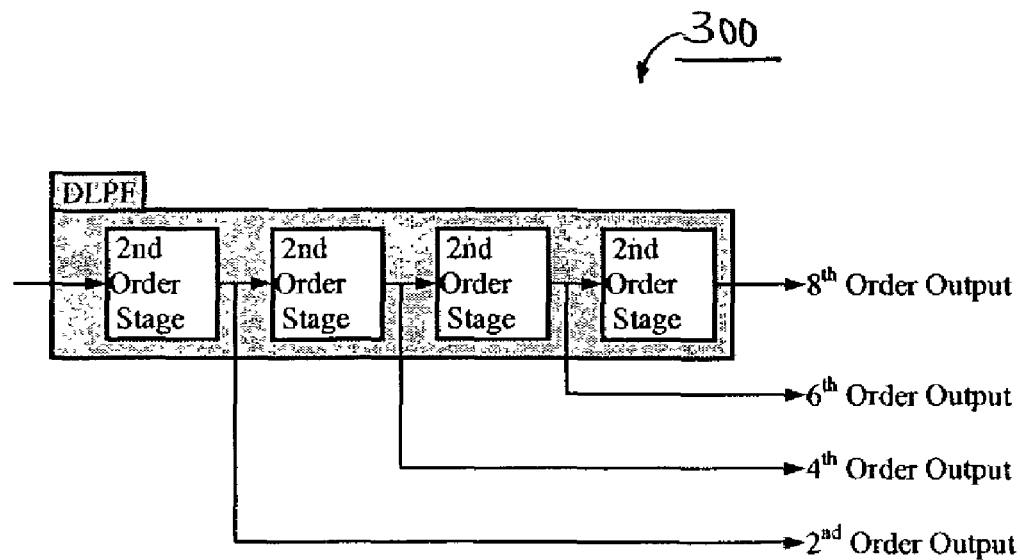
FIG. 3 illustrates a block diagram of an exemplary digital low pass filter (LPF) in accordance with one embodiment of the invention.
Figure 4:
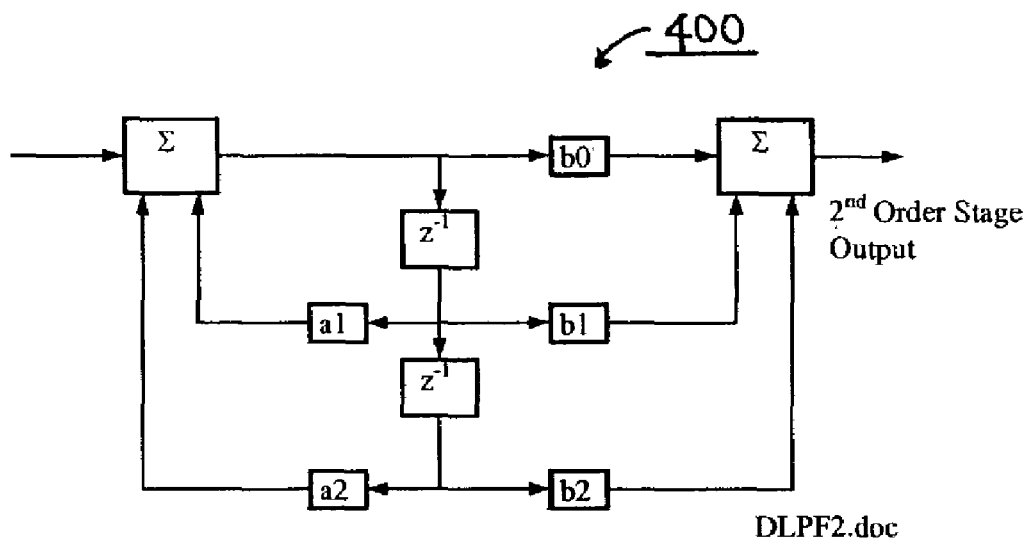
FIG. 4 shows a block diagram of an exemplary $2^{nd}$ order stage in accordance with one embodiment of the invention.

The DLPF blocks are to be multi stage Butterworth filters. The number of stages has to be programmable so that when the final specification for the RF components will be determined in the future, it will be possible to construct a system filtering plan and it will be possible to choose the number of stages required for desired adjacent channel interference reduction. The filters should have the options of having 2nd, 4th, 6th and 8th order filters. An exemplary block diagram of a DLPF is shown in FIG. 3. An exemplary detailed architecture of a $2^{nd}$ order stage is shown in FIG. 4. The exemplary block diagram shown in FIG. 4 implements a transfer function given as $$H(z) = \frac{b_0 + b_1 z^{-1} + b_2 z^{-2}}{1 - a_1 z^{-1} - a_2 z^{-2}}.$$

Exemplary characteristics of DLPF blocks are listed in Table 4. Note that the numerical values of specifications are nominal values that will be refined in the future based on overall system simulations.

TABLE 4

Exemplary Characteristics of DLPF Blocks

| Output Frequency, (Baseband or IF ($f_{IF}$, MHz)) | Filter Type | DLPF_I1 DLPF_Q1 Sampling Frequency (MHz) | DLPF_I1 DLPF_Q1 BW_3_dB, (MHz); Double Sided | DLPF_I2 DLPF_Q2 Sampling Frequency (MHz) | DLPF_I2 DLPF_Q2 BW_3_dB, (MHz); Double Sided | DLPF_I3 DLPF_Q3 Sampling Frequency (MHz) | DLPF_I3 DLPF_Q3 BW_3_dB, (MHz); Double Sided | Butterworth filter order |
|---|---|---|---|---|---|---|---|---|
| Base Band, Option 1 | Low pass | 20 | 18 | | | | | 2, 4, 6, 8 |
| Base Band, Option 2 | Low pass | | | 40 | 18 | | | 2, 4, 6, 8 |
| Base Band, Option 3 | Low pass | | | | | 80 | 18 | 2, 4, 6, 8 |
| 10 | Low pass | | | 40 | 18 | | | 2, 4, 6, 8 |
| 20 | Low pass | | | | | 80 | 18 | 2, 4, 6, 8 |
| 30 | Low pass | | | 40 | 18 | | | 2, 4, 6, 8 |
| 50 | Low pass | | | 40 | 18 | | | 2, 4, 6, 8 |
| 60 | Low pass | | | | | 80 | 18 | 2, 4, 6, 8 |
| 70 | Low pass | | | 40 | 18 | | | 2, 4, 6, 8 |

3.2.1.3.7 Re-construction Filters

Reconstruction filters are Butterworth type analog filters that are used to reconstruct the analog system from the digital format signal at DAC outputs. Exemplary specifications for re-construction filters are given in Table 5. Nominally, the filters are to be implemented Butterworth filters with numerical values of give below. However, the final model and numerical and architectural values are to be determined through simulations to optimize overall system performance. Exemplary characteristics of analog anti-aliasing filters for all IF frequency modes are specified in Table 8.

TABLE 5

Exemplary Re-construction Filter Characteristics

| Output Frequency, (Baseband or IF ($f_{IF}$, MHz)) | Analog Filter Type | Filter Center Frequency f_center (MHz) | BW_3_dB, (MHz); Double Sided | Rejection Characteristics |
|---|---|---|---|---|
| Base Band, Option 1 | Low pass | Base Band | 16.6 | 16 dB @ 20 MHz |
| Base Band, Option 2 | Low pass | Base Band | 16.6 | 12 dB @ 20 MHz |
| Base Band, Option 3 | Low pass | Base Band | 16.6 | 9 dB @ 20 MHz |
| 10 | Low pass | 10 | 36.6 | 16 dB @ 20 MHZ |
| 20 | Low pass | 20 | 56.6 | 12 dB @ 40 MHz |
| 30 | Band pass | 30 | 16.6 | 16 dB @ 20 MHz offset from f_center |
| 50 | Band pass | 50 | 16.6 | 16 dB @ 20 MHz offset from f_center |
| 60 | Band pass | 60 | 16.6 | 12 dB @ 20 MHz offset from f_center |
| 70 | Band pass | 70 | 16.6 | 16 dB @ 20 MHz offset from f_center |

3.2.2 Receiver Converter (RConv)

3.2.2.1 Input Signal Specification

The input signal to RConv is a baseband or bandpass analog 802.11a signal. The RConv should be able to process:

1) Analog baseband 802.11a signal in I-Q format, and 2) Analog bandpass 802.11a signal at IF frequencies of 10, 20, 30, 50, 60, or 70 MH

3.2.2.2 Output Signal Specification

The RConv should convert its input signal to digital format and possibly translate its frequency. The output is a digital I-Q signal with sampling frequency 20 MHz. The resolution of the output digital signal is to be determined in the future (the determination will be based on overall system simulations). At this time, the Ptolemy actor implementing RConv block should be able to output digital data with resolution specified by a parameter, N_ADC. This parameter is an effective measure of the dynamic range of A/D conversion in terms of number of bits.

Please note that for two of the down-conversion options, the ordering of the data symbols that form OFDM symbols have to be modified at the digital demodulator. Specifically for $f_{IF}=30$ MHz and $f_{IF}=50$ MHz options, the order of the signals should be reversed. This is equivalent to reversing the spectral components of the OFDM symbol around the zero frequency.

3.2.2.3 Architecture Specification

Figure 5:
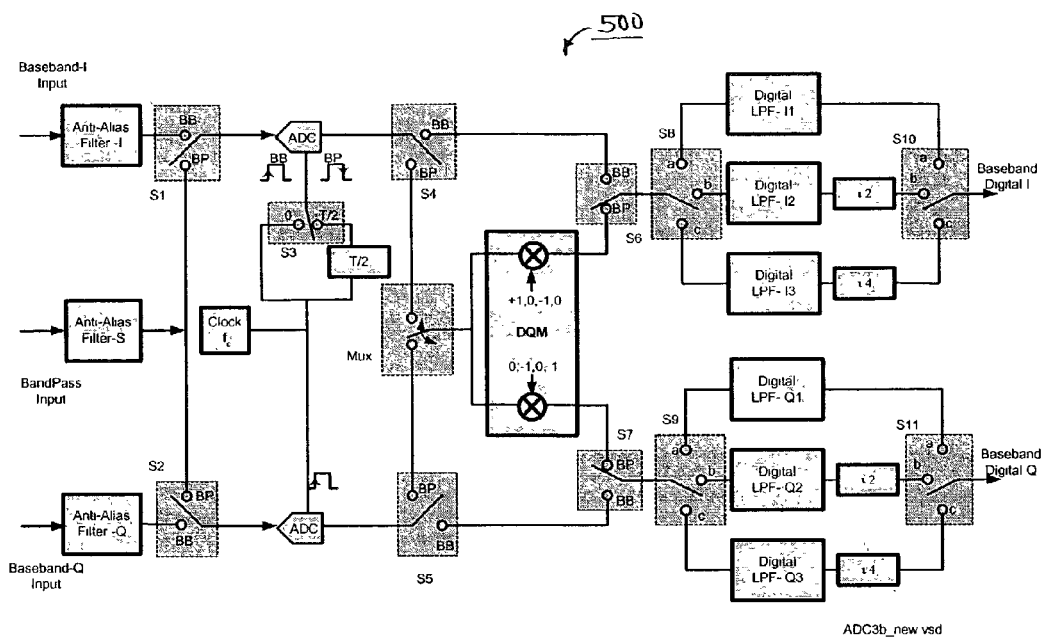
FIG. 5 shows a block diagram of an exemplary receiver converter (Rconv) in accordance with one embodiment of the invention.

RConv should convert its input analog signal with specifications described in Section 3.2.2.1 (entitled "Input Signal Specification") to digital format with specifications described in Section 3.2.2.2 (entitled "Output Signal Specification"). For an exemplary block diagram representation, please see FIG. 5.

3.2.2.3.1 Clock, $f_c$

Exemplary clock ($f_c$) frequencies for each of IF frequency ($f_{IF}$) modes are described in Table 6. For each of output frequency modes, an exemplary effective sampling frequency obtained is also given in Table 1. Effective sampling frequency obtained for baseband output modes is the same as the clock frequency. However, for the IF output signal modes, the effective sampling frequency is twice the clock frequency, $f_c$. Effective sampling frequencies of 40 and 80 MHz are obtained with clock frequencies of 20 and 40 MHz by utilizing a multiplexer.

TABLE 6

Exemplary Receiver convert 1F, Clock, and Effective Sampling Frequencies

| Input Frequency, (Baseband or IF ($f_{IF}$, MHz)) | Clock Frequency (fc), MHz | Effective Sampling Frequency (fs), MHz |
|---|---|---|
| Base Band, Option 1 | 20 | 20 |
| Base Band, Option 2 | 40 | 40 |
| Base Band, Option 3 | 80 | 80 |
| 10 | 20 | 40 |
| 20 | 40 | 80 |
| 30 | 20 | 40 |
| 50 | 20 | 40 |
| 60 | 40 | 80 |
| 70 | 20 | 40 |

3.2.2.3.2 Up-samplers

The up-sampler used for BB modes are "zero insertion" type up samplers. That is, one zero after each sample is inserted. Note that as digital filter blocks follow the up sampler (after passing through two switches), there is no need for digital filtering embedded in the up-sampler blocks.

3.2.2.3.3 Digital Quadrature Mixer (DQM)

DQM block performs down conversion of baseband signals to baseband frequencies. The mixer sequences represent cos() and sin() mixing signals. Due to special relationship of the sampling frequency and desired low IF frequency, these signals are repetitive forms of +1,0, −1, 0 and 0, −1, 0, +1.

3.2.2.3.4 A/D Converters

For A/D's we should have an application model with the number bits chosen by the user. Currently the baseline is 10 bits. For simulation models to be used for ADCs please see the section on simulation models. Please note that an A/D converter actor has already been implemented. It is possible to reuse this actor and save development time.

3.2.2.3.5 Switches

There are several exemplary switches that direct the signal flow through the TConv as can be seen in FIG. 1. These switches enable operation with various input sampling frequencies and baseband and bandpass input and output signal formats. Each switch is identified with a switch number and labels that describe switch settings. The switches S1, S2, S3, and S4 enable input signal sampling frequencies of 20, 40 and 80 MHz. Switches S5 and S6 choose between low IF bandpass (BP) and baseband (BB) input. Switches S7 and S8 choose between baseband/bandpass in I-Q, and, bandpass single line output.

TABLE 7

Exemplary Switch settings for operational modes of RConv

| Input Frequency, (Baseband or IF ($f_{IF}$, MHz)) | S1 | S2 | S3 | S4 | S5 | S6 | S7 | S8 | S9 | S10 | S11 |
|---|---|---|---|---|---|---|---|---|---|---|---|
| Base Band, Option 1 | BB | BB | 0 | BB | BB | BB | BB | a | a | a | a |
| Base Band, Option 2 | BB | BB | 0 | BB | BB | BB | BB | b | b | b | b |
| Base Band, Option 3 | BB | BB | 0 | BB | BB | BB | BB | b | b | b | b |
| 10 | BP | BP | T/2 | BP | BP | BP | BP | b | b | b | b |
| 20 | BP | BP | T/2 | BP | BP | BP | BP | c | c | c | c |
| 30 | BP | BP | T/2 | BP | BP | BP | BP | b | b | b | b |
| 50 | BP | BP | T/2 | BP | BP | BP | BP | b | b | b | b |
| 60 | BP | BP | T/2 | BP | BP | BP | BP | c | c | c | c |
| 70 | BP | BP | T/2 | BP | BP | BP | BP | b | b | b | b |

3.2.2.3.6 Analog Anti-Aliasing Filters

Anti-aliasing filters for I and Q arms have similar characteristics. These filters operate on I and Q components of input baseband analog signals. Anti-aliasing filter-S is used for avoiding aliasing components for input low IF analog signals.

All filters are to be implemented as Butterworth type filters. The numerical values of specifications are nominal values that will be optimized in the future. Optimizations will be based on overall system simulations. Exemplary characteristics of anti-aliasing analog filters for all IF frequency modes are specified in Table 8.

TABLE 8

Exemplary Analog Anti-Aliasing Filter Characteristics

| Input Frequency, (Baseband or IF ($f_{IF}$, MHz)) | Analog Filter Type | Dual or Single Filters | Filter Center Frequency f_center (MHz) | BW_3_dB, (MHz); Double Sided | Rejection Characteristics |
|---|---|---|---|---|---|
| Base Band, Option 1 | Low pass | Dual | Base Band | 16.6 | 16 dB @ 20 MHz |
| Base Band, Option 2 | Low pass | Dual | Base Band | 16.6 | 12 dB @ 20 MHz |

TABLE 8-continued

Exemplary Analog Anti-Aliasing Filter Characteristics

| Input Frequency, (Baseband or IF ($f_{IF}$, MHz)) | Analog Filter Type | Dual or Single Filters | Filter Center Frequency f_center (MHz) | BW_3_dB, (MHz); Double Sided | Rejection Characteristics |
|---|---|---|---|---|---|
| Base Band, Option 3 | Low pass | Dual | Base Band | 16.6 | 9 dB @ 20 MHz |
| 10 | Low pass | Single | 10 | 36.6 | 16 dB @ 20 MHZ |
| 20 | Low pass | Single | 20 | 56.6 | 12 dB @ 40 MHz |
| 30 | Band pass | Single | 30 | 16.6 | 16 dB @ 20 MHz offset from f_center |
| 50 | Band pass | Single | 50 | 16.6 | 16 dB @ 20 MHz offset from f_center |
| 60 | Band pass | Single | 60 | 16.6 | 12 dB @ 20 MHz offset from f_center |
| 70 | Band pass | Single | 70 | 16.6 | 16 dB @ 20 MHz offset from f_center |

The analog anti aliasing filters can be the same physical filters utilized for re-construction filters.

3.2.2.3.7 Multiplexer

The multiplexer (Mux) is used for converting the parallel and time interlaced samples obtained by half-cycle skewed A/D converters in to serial form. In "20 MHz" and "40 MHz" modes the multiplexer switches between the two time skewed input at rates of 20 and 40 MHz to provide effective sampling frequencies of 40 and 80 MHz.

3.2.2.3.8 Digital Lowpass Filters (DLPF)

Specification of DLPF blocks for RConv are similar to DLPF blocks defined for TConv in Section 3.2.1.3.6.

3.2.2.3.8 Down-samplers

Down sampler blocks reduce the sampling frequency by picking one sample out of a number of consecutive samples (2 or 4). For each IF frequency mode, an exemplary down sampling ratio is shown in Table 9.

TABLE 9

Exemplary Down Sampler Decimation Ratios

| Input Frequency, (Baseband or IF ($f_{IF}$, MHZ)) | Clock Frequency (fc), MHz | Effective Sampling Frequency (fs), MHz | Decimation Ratio |
|---|---|---|---|
| Base Band, Option 1 | 20 | 20 | N/A |
| Base Band, Option 2 | 40 | 40 | 2 |
| Base Band, Option 3 | 80 | 80 | 4 |
| 10 | 20 | 40 | 2 |
| 20 | 40 | 80 | 4 |
| 30 | 20 | 40 | 2 |
| 50 | 20 | 40 | 2 |
| 60 | 40 | 80 | 4 |
| 70 | 20 | 40 | 2 |

3.3 Adaptive Compensation (AC) System

The flow of signal through the Adaptive Compensation system was described in Section 3.1. Below we describe each of the sub blocks of the AC System.

3.33.1 Transmitter Compensator (TComp)

3.3.1.1 Input Signal Specification

Processing in blocks prior to TComp include all the relevant processing prior to IFFT and windowing. Thus, the input to TComp is a sequence of 52 element data blocks each with 48 data symbols and 4 pilot symbols. The rate with which the data blocks are processed is once every 4 microseconds (when transmitting Long Preamble, Signal, or, Data blocks). The input signal resolution is to be flexible and be specified by a parameter, N_DAC with default setting of 10.

3.3.1.2 Output Signal Specification

The output is a time domain OFDM modulated 802.11a digital baseband signal. The input signal rate is 20 MHz. The signal resolution is to be flexible and be specified by a parameter, N_DAC with default setting of 10.

3.3.1.3 Architecture Specification

3.3.1.3.1 Spectral Pre-Compensation (SPreC)

Figure 6:
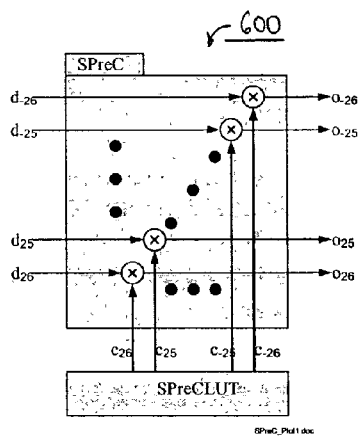
FIG. 6 illustrates a block diagram of an exemplary spectral pre-compensator (SpreC) according to one embodiment of the invention.

Transmitter circuitry shall include a digital Spectral Pre-Compensation (SPreC) block that will compensate against transmitter undesired amplitude and phase characteristics. The SPreC block shall include a vector multiplier that will multiply the input 52 element complex vector with the 52-element correction vector whose elements are to be obtained from the SPreCLUT block. For an exemplary block diagram of SpreC, please see FIG. 6.

3.3.1.3.2 Spectral Pre-Compensation Lookup Table (SPreCLUT)

Transmitter circuitry shall include a digital Spectral Pre-Compensation Lookup table (SPreCLUT) block that will store a 52 element complex array whose elements to be used by the SPreC block.

3.3.1.3.3 Envelope Pre-Compensation (EPreC)

Figure 7:
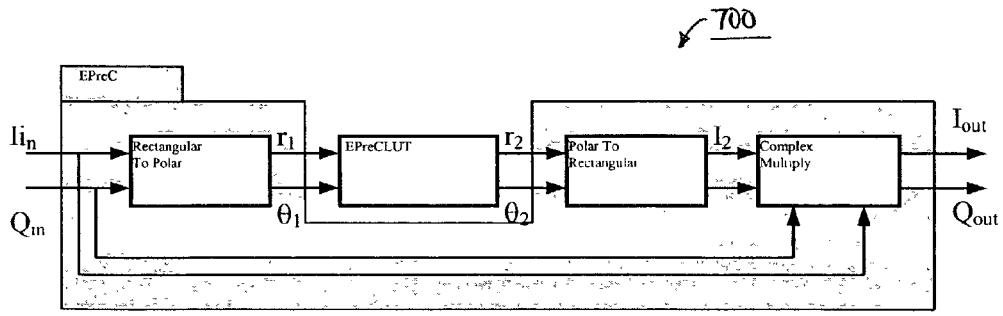
FIG. 7 illustrates a block diagram of an exemplary envelope pre-compensation (EpreC) unit according to one embodiment of the invention.

Transmitter circuitry include a digital Envelope Pre-Compensation (EPreC) block that will compensate against undesired transmitter non-linearity characteristics. An exemplary Envelope Pre-Compensation (EPreC) block diagram is shown in FIG. 7.

3.3.1.3.4 Envelope Pre-Compensation Look Up Table (EPreCLUT)

Transmitter circuitry shall include a digital Envelope Pre-Compensation Look Up Table (EPreCLUT) block that will store two complex arrays whose elements will be used by the EPreC block. The two arrays are to be used form compensating against AM/AM and AM/PM conversion respectively. The lengths of these arrays are strongly related to the number of bits used to represent I and Q signals at the output of the modulator output. For example, for 10 bit inputs the lookup table shall, tentatively, contain $2^{11}$ elements each. Note that specification for array lengths are to be refined in the future.

3.3.2 Receiver Compensator (RComp)

3.3.2.1 Input Signal Specification

The input signal to RComp is the direct output of RConv block. The input is a time domain OFDM modulated 802.11a digital I-Q signal with sampling frequency 20 MHz. The Ptolemy actor implementing RConv block should be able to output digital data with resolution specified by a parameter, N_ADC with default value of 10 bits.

3.3.2.2 Output Signal Specification

The output signal is a frequency domain OFDM modulated 802.11a digital baseband signal. The rate with which the data blocks are processed is once every 4 microseconds (when transmitting Long Preamble, Signal, or, Data blocks). The output is a sequence of 52 element data blocks each with 48 data symbols and 4 pilot symbols. The input signal resolution is to be flexible and be specified by a parameter, N_ADC with default setting of 10.

3.3.2.3 Architecture Specification

3.3.2.3.1 Spectral Post-Compensation (SPostC)

Figure 8:
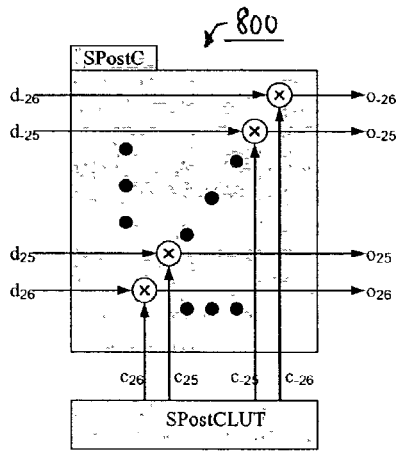
FIG. 8 illustrates a block diagram of an exemplary spectral post-compensator (SpostC) according to one embodiment of the invention.

Spectral Post-Compensation (SPostC) block will compensate against undesired receiver amplitude and phase characteristics. The SPostC block shall include a vector multiplier that will multiply the input 52 element complex vector with the 52-element correction vector whose elements are to be obtained from the SPostCLUT block. For an exemplary block diagram of SpostC, please see FIG. 8.

3.3.2.3.2 Spectral Post-Compensation Look Up Table (SPostCLUT)

Receiver circuitry shall include a digital Spectral Post-Compensation Look Up Table (SPostCLUT) block that will store a 52 element complex array whose elements to be used by the SPostC block.

3.3.2.3.3 Envelope Post-Compensation (EPostC)

Figure 9:
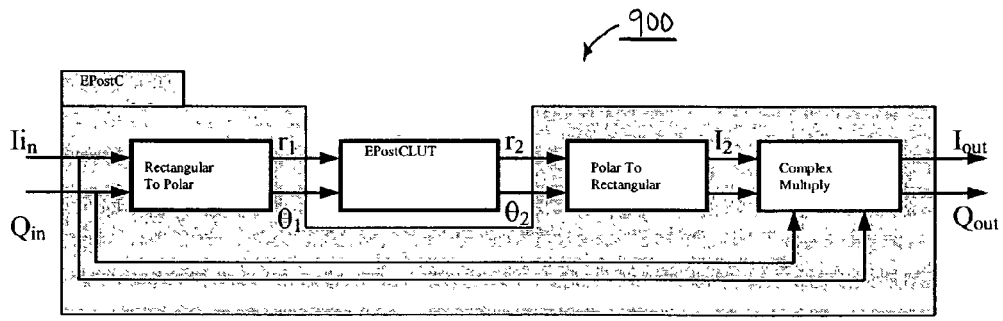
FIG. 9 illustrates a block diagram of an exemplary envelope post-compensation (EpostC) unit according to one embodiment of the invention.

Receiver circuitry shall include a digital Envelope Post-Compensation (EPostC) block that will compensate against undesired receiver non-linearity characteristics. An exemplary Envelope Pre-Compensation (EPreC) block diagram is shown in FIG. 9.

3.3.2.3.4 Envelope Post-Compensation Look Up Table (EPostCLUT)

Receiver circuitry shall include a digital Envelope Post-Compensation Look Up Table (EPostCLUT) block that will store two complex arrays whose elements will be used by the EPreC block. The two arrays are to be used form compensating against AM/AM and AM/PM conversion respectively. The lengths of these arrays are strongly related to the number of bits used to represent I and Q signals at the output of the modulator output. For example, for 10 bit inputs the lookup table shall, tentatively, contain $2^{11}$ elements each. Note that specification for array lengths are to be refined in the future.

3.3.3 Adaptive Compensation Control Unit (ACCU)

The Adaptive Calibration/Compensation Control Unit controls and orchestrates the calibration on compensation processes described in the next sections. The ACCCU also utilizes adaptive estimation techniques such as Extended Kalman Algorithm to dynamically estimate the characteristics of interest. If a particular measured characteristic of interest is not within a given margin relative to a desired characteristic, the contents of SPreCLUT, EPreCLUT, SPostCLUT and EPostCLUT blocks are updated. Upon characterizing the device characteristics, necessary values to compensate against these characteristics can be stored in the SPreCLUT, EPreCLUT, SPostCLUT and EPostCLUT blocks.

3.3.3.1 Architecture Specification

Detailed specification of architecture is to be determined. Two key procedures, namely compensation and calibration are described in the following.

3.3.3.1.1 Factory Calibration Procedure

The calibration procedure is utilized during the manufacturing process in the factory to calibrate the Tx and Rx chains. The procedure includes the steps:

1. Characterize receiver spectral characteristics (amplitude and phase transfer functions). Measurements conducted by feeding probing signals of known spectral characteristics with suitable magnitude to the antenna port or any other suitable port in the receiver RF chain. The estimates of spectral characteristics are based on the spectral characteristics of the probing signals and the measured spectral characteristics upon propagation of the probing signal through the receiver chain.
2. Define the contents of SPostCLUT based on these measurements.
3. Characterize transmitter spectral characteristics. A probing signal is generated at the baseband section of the transmitter chain. The probing signal is propagated through the transmitter chain, is looped back to the receiver chain through a special loopback feature, and, propagated through the receiver chain including the SPostC. Measurement of spectral characteristics is based on the spectral characteristics of the probing signals and the measurement of resultant signal spectral characteristics at a port operating digitally at baseband frequencies.
4. Define the contents of SPreCLUT based on these measurements.
5. Characterize receiver linearity characteristics. Measurements conducted by feeding probing signals at various amplitude levels to the antenna port or any other suitable port in the receiver RF chain. Input amplitude vs. output amplitude characteristic of the receiver chain is then extracted.
6. Define the contents of EPostCLUT based on these measurements.
7. Characterize transmitter linearity characteristics. Probing signals at various amplitudes are generated at the baseband section of the transmitter chain. The probing signal is propagated through the transmitter chain, is looped back to the receiver chain through a special loopback feature, and, propagated through the receiver chain. Input amplitude vs. output amplitude characteristic of the transmitter chain is extracted.
8. Define the contents of EPreCLUT based on these measurements.

3.3.3.1.2 In-Field Continued Calibration Procedure

Typically, analog component characteristics in the system tend to vary as a result of temperature variations in the system around the transceiver, and, as a result of the aging process of silicon. During operation of the transceiver in the field, continued compensation against component and system characteristics are conducted.

The procedure includes:
1. Characterize receiver spectral characteristics based on the spectral characteristics of the expected signals and actual received signals. Due to possible fading profile of the channel, an algorithm to average received signal spectral characteristics over a long time interval is necessary.
2. Modify the contents of SPostCLUT based on these measurements.
3. Characterize transmitter spectral characteristics. A probing signal is generated at the baseband section of the transmitter chain. The probing signal is propagated through the transmitter chain, is looped back to the receiver chain through a special loopback feature, and, propagated through the receiver chain including the SPostC. Measurement of spectral characteristics is based on the spectral characteristics of the probing signals and the measurement of resultant signal spectral characteristics at a port operating digitally at baseband frequencies.
4. Modify the contents of SPreCLUT based on these measurements.
5. Characterize transmitter linearity characteristics. Probing signals at various amplitudes are generated at the baseband section of the transmitter chain. The probing signal is propagated through the transmitter chain. Signal output level from the PA is measured through appropriate means. Input amplitude vs. output amplitude characteristic of the receiver transmitter chain is extracted. AM/PM conversion is also measured through appropriate manners.
6. Modify the contents of EPreCLUT based on these measurements.
7. Characterize receiver linearity characteristics. Probing signals at various amplitudes are generated at the baseband section of the transmitter chain. The probing signal is propagated through the transmitter chain, is looped back to the receiver chain through a special loopback feature, and, propagated through the receiver chain. Input amplitude vs. output amplitude characteristic of the receiver chain is extracted. Similarly, with same measurement techniques, phase characteristics of the spectral characteristics can be measured.
8. Modify the contents of EPostCLUT based on these measurements.

3.3.4 Loop Back Facility

Typical solutions use two sensors that measure AM/AM ad AM/PM at the PA output. To eliminate these extra circuits we want to use a loopback facility. The loopback facility will be used during initial calibration and later during the transceiver in the field. When in the field, it will operate either during transmission or during idle times.

4 Analog IF/RF System Blocks Modeling 4.4 Power Amplifier:

We use the industry accepted Rapp PA model and Saleh Models. Rapp PA model has been accepted as the reference model for the IEEE 802.11a and 802.11g standardization work groups. Saleh Model has be a widely used PA model in the past decades. The reference Matlab code can be obtained from IEEE web page. Please note that this model has already been implemented as a Ptolemy actor. Thus, it is possible to re-use this actor to reduce development time.

4.5 Phase Noise:

We use phase noise model that is available from IEEE 802.11 web page. The reference Matlab code file name MainPHzNoiseTest.m, Date Sep. 19, 2000. Please note that this model has already been implemented as a Ptolemy actor. Thus, it is possible to re-use this actor to reduce development time.

4.6 Multi-path Channel Model:

We use phase noise model that is available from IEEE 802.11 web page. The reference Matlab code can be obtained from IEEE web page. File name ExpChanTaps.m, Date: Sep. 19, 2000. Please note that this model has already been implemented as a Ptolemy actor. Thus, it is possible to re-use this actor to reduce development time.

4.7 DC Offset

It is possible that in silicon implementation the RF section generates a small DC value at base band. We simulate this effect by adding a DC component to the baseband I and Q component signals. Please note that this model has already been implemented as a Ptolemy actor. Thus, it is possible to re-use this actor to reduce development time.

4.8 ADC Non-Idealities

ADC elements used in simulations should be able to provide non-ideal characteristics as well as ideal transfer characteristics. An input parameter should determine whether the ideal or non-ideal characteristic is to be used. The models should be flexible enough to provide INL values of 0.25, 0.5, 0.75, and 1.0, and, DNL values of 0.25, 0.5, 0.75, and 1.0.

4.9 DAC Non Idealities

DAC elements used in simulations should be able to provide non-ideal characteristics as well as ideal transfer characteristics. An input parameter should determine whether the ideal or non-ideal characteristic is to be used. The models should be flexible enough to provide INL values of 0.25, 0.5, 0.75, and 1.0, and, DNL values of 0.25, 0 5, 0.75, and 1.0

4.10 I-Q Imbalance

The simulation package should have the capability to be able to simulate up to 10° phase imbalance and 1 dB amplitude imbalance. The amplitude imbalance has already been implemented as a Ptolemy actor. Thus, it is possible to re-use this actor to reduce development time. However, additional development for phase imbalance is necessary.

It should be noted that functional components, as shown in the figures and described above in the text accompanying the figures, could be implemented using software code segments. If the aforementioned functional components are implemented using software code segments, these code segments can be stored on a machine-readable medium, such as floppy disk, hard drive, CD-ROM, DVD, tape, memory, or any storage device that is accessible by a computing machine.

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:
1. An apparatus comprising:
a compensation component to perform signal compensation with respect to input signals to generate compensated output signals, including:
a first spectral compensation unit to compensate spectral characteristics of a first digital signal; and a first envelope compensation unit to compensate linearity characteristics of the first digital signal; and a second spectral compensation unit to compensate spectral characteristics of a second digital signal; and a second envelope compensation unit coupled to receive a second digital signal generated by a second converter and to compensate linearity characteristics of the second digital signal; and a conversion component to perform signal conversion between digital format and analog format, including:

a first converter coupled to convert the first digital signal to analog format after the first digital signal is compensated by the first spectral compensation unit and the first envelope compensation unit a second converter coupled to receive a first analog signal and convert the first analog signal to digital format after the first digital signal is compensated by the first spectral compensation unit and the first envelope compensation unit the first spectral compensation unit utilizes data provided by a first spectral lookup table, the first envelope compensation unit utilizes data provided by a first envelope lookup table, the second spectral compensation unit utilizes data provided by a second spectral lookup table, and the second envelope compensation unit utilizes data provided by a second envelope lookup table to perform their corresponding functions.

2. The apparatus of claim 1 wherein the first converter is configured to convert the first digital signal to analog baseband format.

3. The apparatus of claim 1 wherein the first converter is configured to convert the first digital signal to analog intermediate frequency (IF) format.

4. The apparatus of claim 1 wherein the first analog signal is in analog baseband format.

5. The apparatus of claim 1 wherein the first analog signal is in analog intermediate frequency (IF) format.

6. The apparatus of claim 1 further including:

a compensation control unit to control calibration of the first and second spectral compensation units.

7. The apparatus of claim 6 wherein the compensation control unit is used to control calibration of the first and second envelope compensation units.

8. The apparatus of claim 7 wherein the compensation control unit updates the first and second spectral lookup table based on estimated spectral characteristics and updates the first and second envelope lookup tables based on estimated linearity characteristics.

9. A system comprising:

an adaptive compensation component to perform spectral and linearity compensation on input digital signals to generate output digital signals that are compensated against spectral and linearity variations in the system; and a conversion component coupled to the adaptive compensation component, the conversion component to perform conversion between digital and analog formats, the conversion component to receive digital signals generated by the adaptive compensation component and to convert the received digital signals to analog format, and the conversion component to receive analog signals and convert the received analog signals to digital format for inputted to the adaptive compensation component;

the adaptive compensation component being responsive to a spectral lookup table and an envelope lookup table to perform its corresponding functions;

wherein the adaptive compensation component includes;

a first spectral compensation unit to receive and compensate spectral characteristics of a first digital signal: and a first envelope compensation unit to compensate linearity characteristics of the first digital signal;

a second envelope compensation unit coupled to receive and compensate linearity characteristics of a second digital signal; and a second spectral compensation unit to compensate spectral characteristics of the second digital signal.

10. The system of claim 9 wherein the conversion component includes:

a first converter to receive and convert the compensated first digital signal generated by the first envelope compensation unit to analog format; and a second converter coupled to receive and convert an analog signal to the second digital signal.

* * * * *